Oct. 7, 1924.
A. J. GRAVENBERG
1,510,776
CENTRIFUGAL
Filed Aug. 26, 1922
6 Sheets-Sheet 1
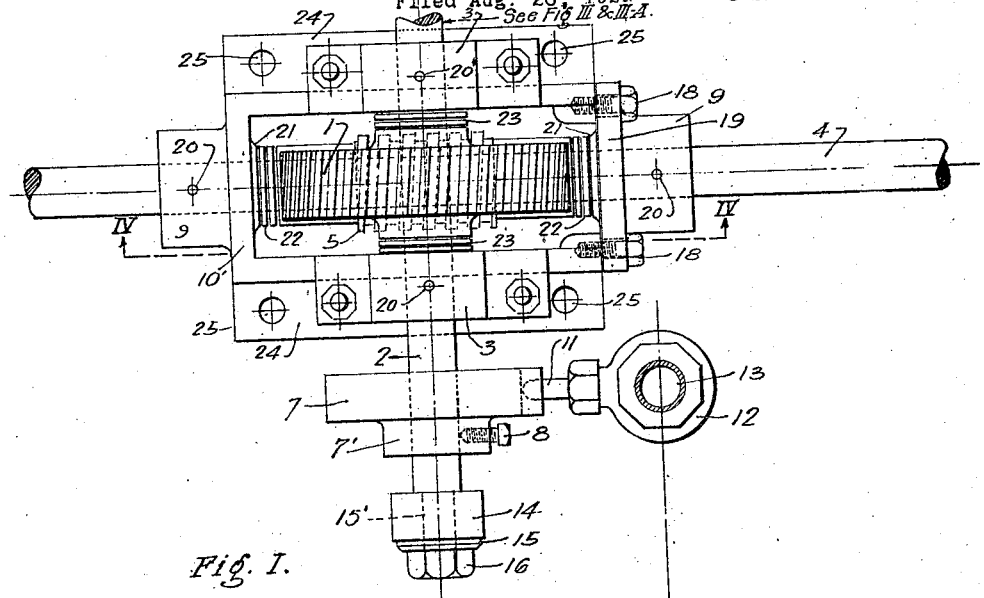
Fig. I.
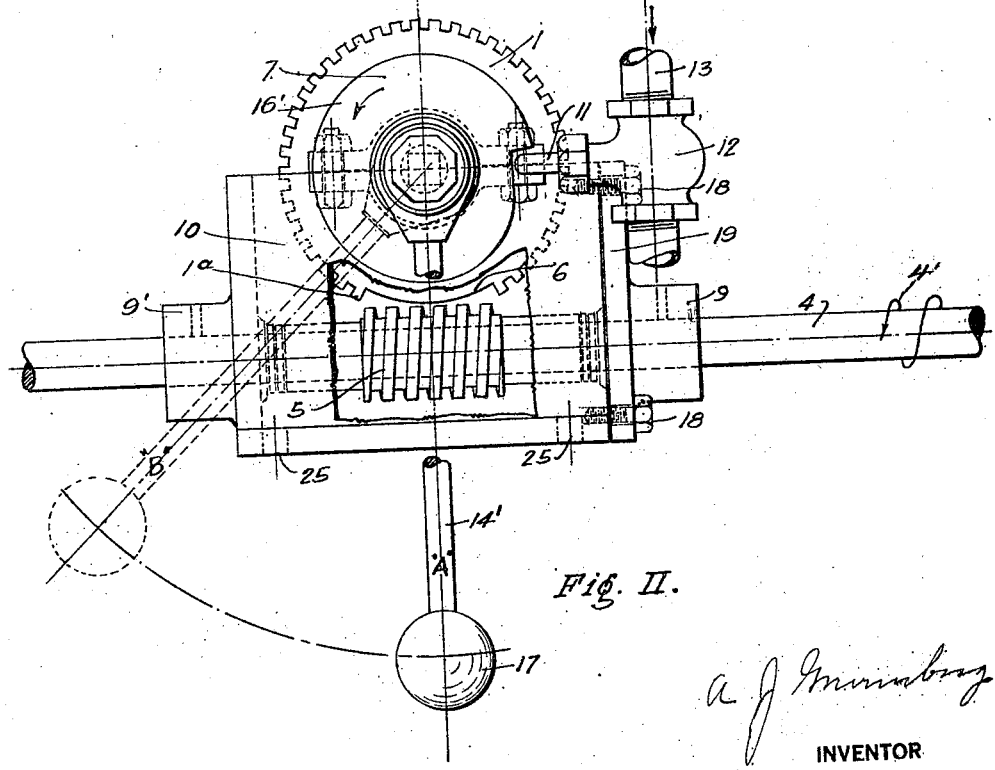
Fig. II.
INVENTOR
BY
ATTORNEY Oct. 7, 1924.
A. J. GRAVENBERG
CENTRIFUGAL
Filed Aug. 26, 1922     6 Sheets-Sheet 2
1,510,776
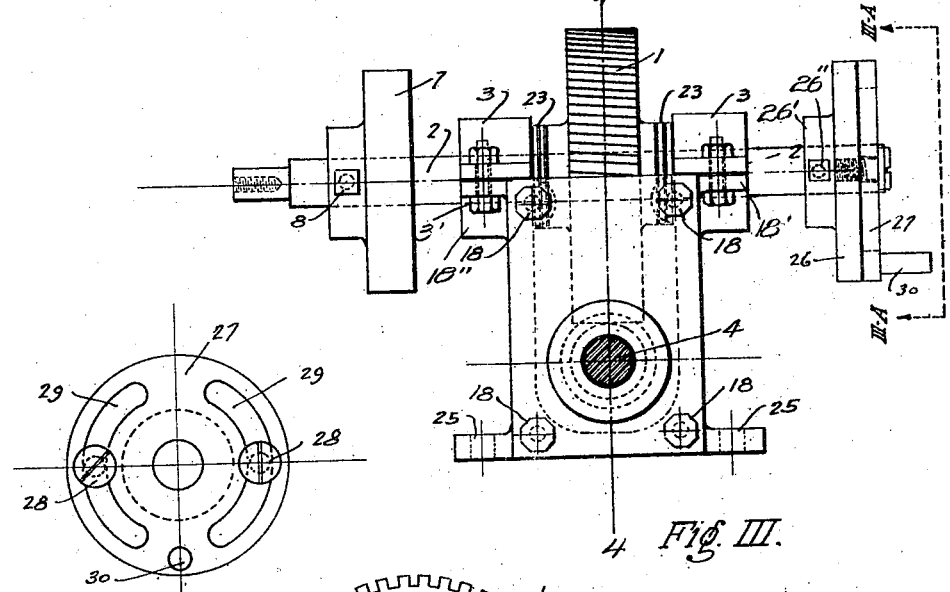
Fig. III.
Fig. III-A.
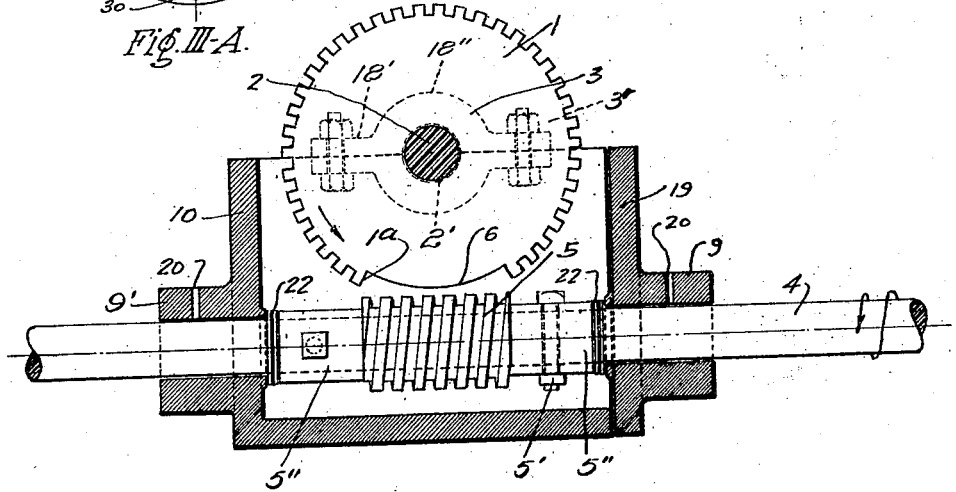
Fig. IV.
A. J. Gravenberg
INVENTOR
BY
Geo. F. Kimmel
ATTORNEY Oct. 7, 1924.
A. J. GRAVENBERG
CENTRIFUGAL
Filed Aug. 26, 1922 — 6 Sheets-Sheet 3
1,510,776
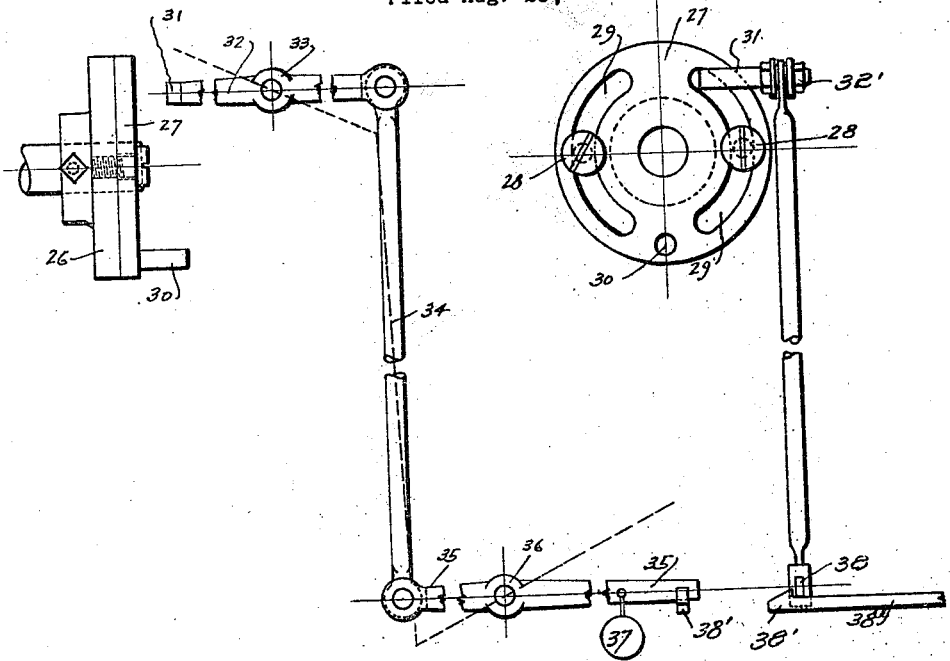
Fig. V.   Fig. VA.
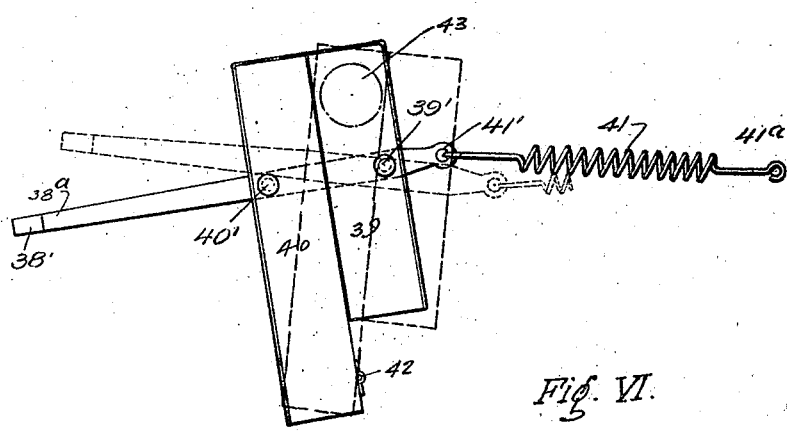
Fig. VI.
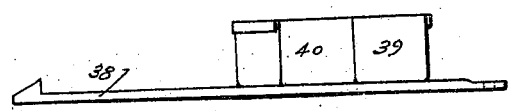
Fig. VIA.
INVENTOR
BY
ATTORNEY

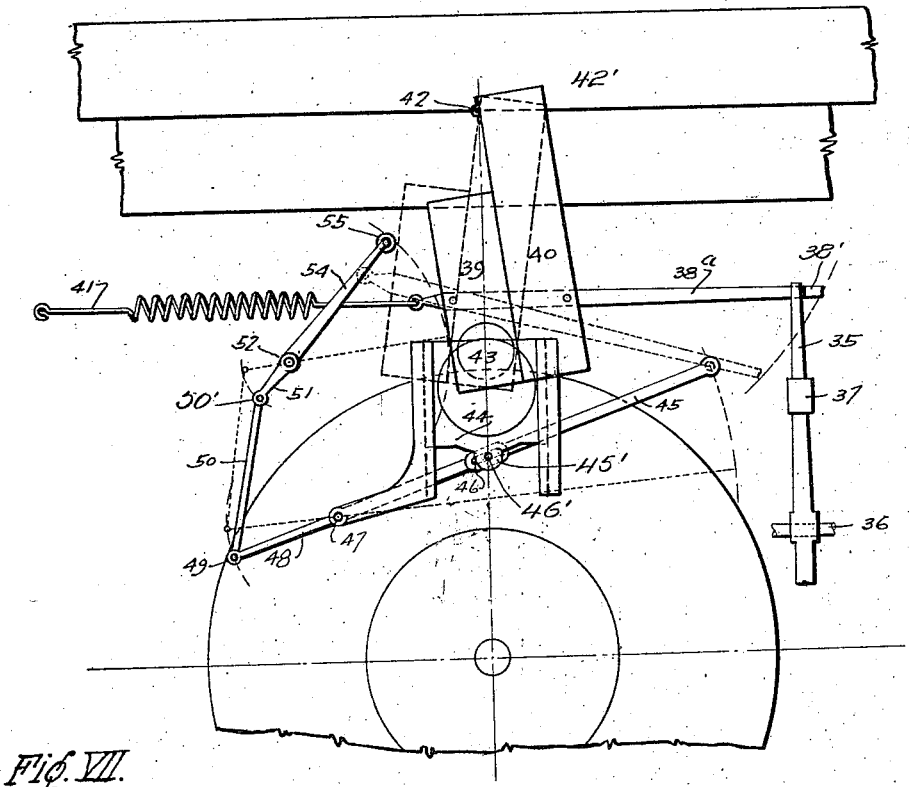
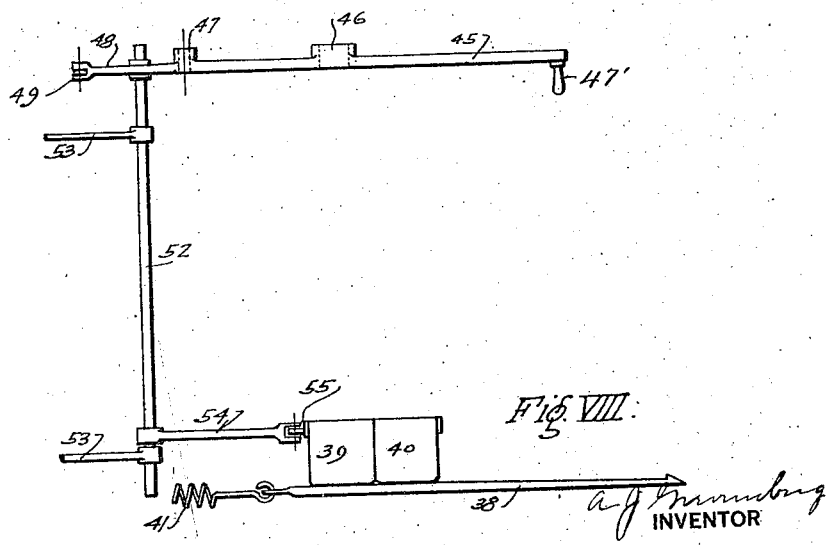

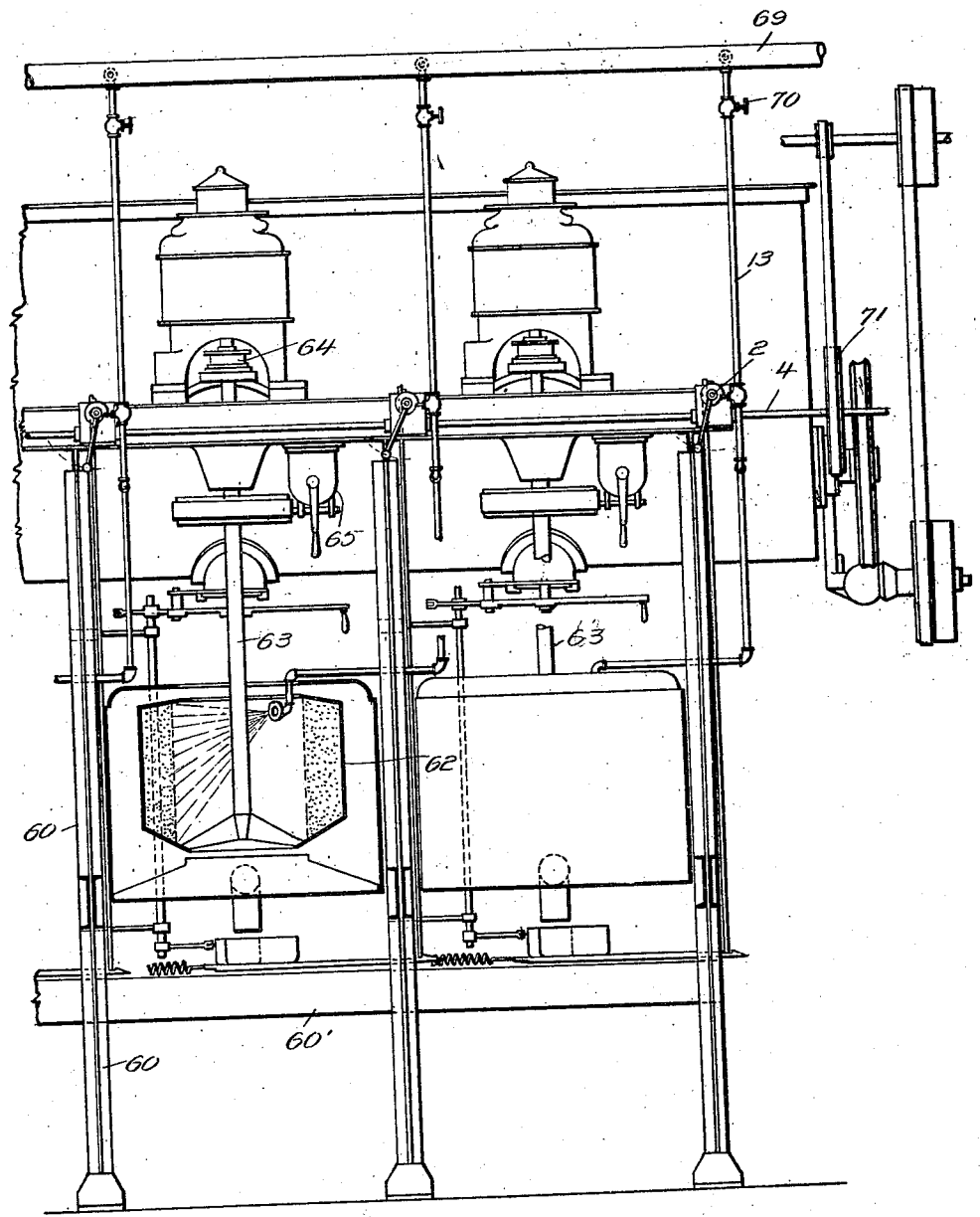
Fig. IX.

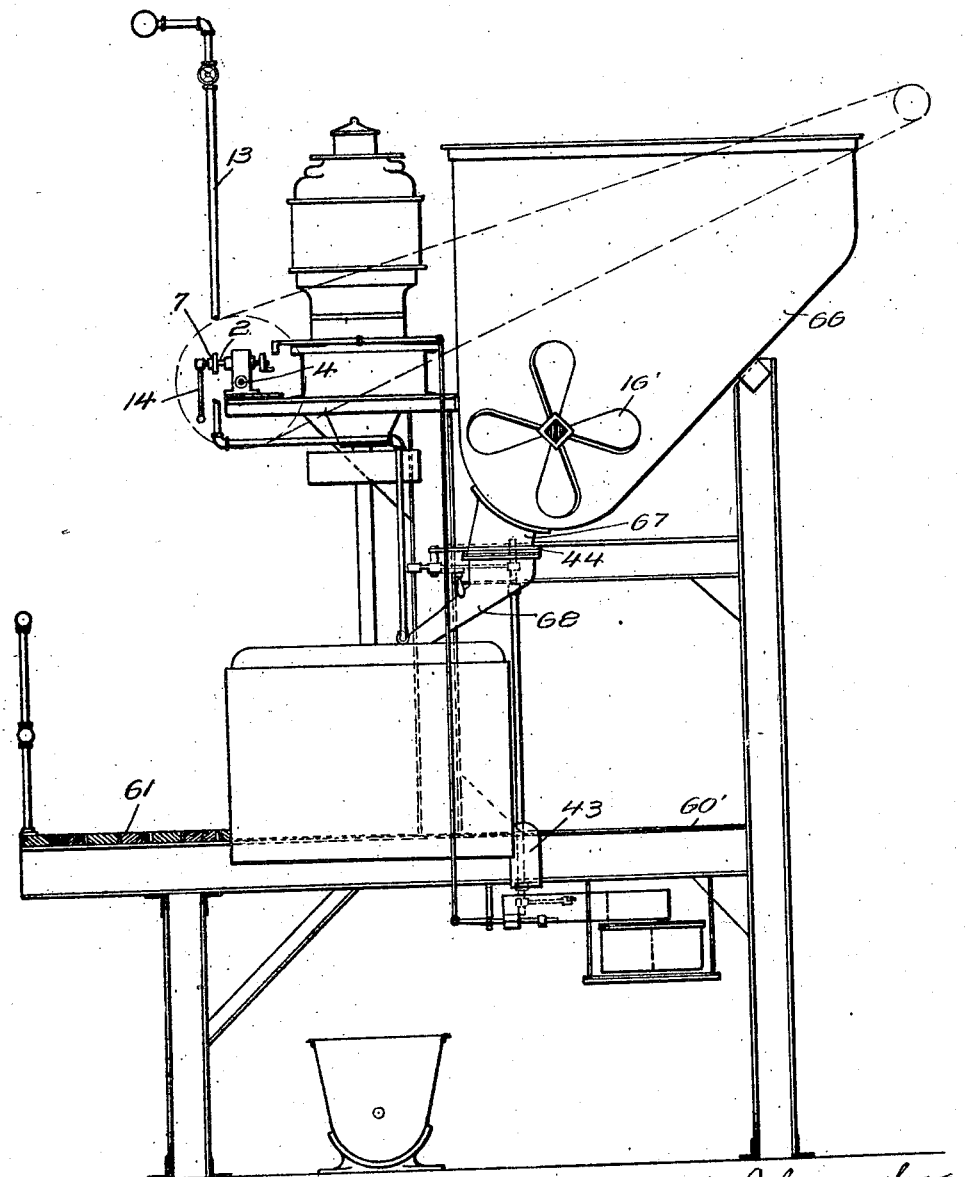

Patented Oct. 7, 1924.

1,510,776

UNITED STATES PATENT OFFICE.

ALBERT J. GRAVENBERG, OF SAVANNAH, GEORGIA.

CENTRIFUGAL.

Application filed August 26, 1922. Serial No. 584,521.

*To all whom it may concern:*

Be it known that I, ALBERT J. GRAVENBERG, a citizen of the United States, residing at Savannah, in the county of Chatham and State of Georgia, have invented certain new and useful Improvements in Centrifugals, of which the following is a specification.

This invention relates to that class of machines known as centrifugals, and which are used in the manufacture of sugar for extracting from the masse-cuites the green and wash syrups; more particularly to water measuring and trough shifting mechanisms employed in connection with the centrifugal, and the invention has for one of its objects to provide in a manner as herein referred to, an intermittent operable mechanism for measuring and supplying a predetermined amount of water under pressure to the centrifugal elements of the machine for washing sugar, and the invention has for another of its objects, to provide in a manner as hereinafter set forth, an intermittently operable trough shifting mechanism to provide for the separation of the green, or first run-off, from the wash, or second run-off syrup discharged from the centrifugal elements of the machine.

A further object of the invention is to provide a centrifugal of the class referred to, in a manner as hereinafter set forth, with means common to the water measuring and trough shifting mechanism for synchronously operating them for the purpose stated.

Further objects of the invention are to provide a centrifugal with water measuring and trough shifting mechanisms, which are comparatively simple in their construction and arrangement, strong, durable, efficient in use, synchronously operated, readily set up in operative relation with respect to each other, and comparatively inexpensive.

With the foregoing and other objects in view, the invention consists of the novel construction, combination and arrangement of parts, as hereinafter more specifically described, and illustrated in the accompanying drawings, wherein is shown an embodiment of the invention, but it is to be understood that changes, variations and modifications can be resorted to which come within the scope of the claims hereunto appended.

In the drawings, wherein like reference characters denote corresponding parts throughout the several views:—

Figure I is a top plan and

Fig. II is a side elevation, both broken away, illustrating the actuating means common to the water measuring and trough shifting mechanism.

Fig. III is an end view of the common operating means for the watering measuring and trough shifting mechanism.

Figure III$^A$ is a fragmentary view illustrating an actuating element for releasing the locking device of the trough shifting mechanism.

Fig. IV is a section on line IV—IV of Fig. III.

Figs. V and V$^A$ are respectively side and front views of the trough shifting mechanism.

Fig. VI is a view illustrating the troughs, showing the normal position in full lines and their shifted position in dotted lines.

Fig. VI$^A$ is a detail illustrating the troughs in end view.

Fig. VII is an enlarged plan view.

Fig. VIII is a side elevation illustrating the shifting mechanism for the trough.

Fig. IX is a front elevation of a battery of centrifugals, and

Fig. X is a side elevation of Fig. IX.

Referring to Figs. IX and X of the drawings, which illustrate a battery of centrifugals, 60 and 60' denote vertical and horizontal supporting standards for the various elements of the battery, 61 indicates a platform for the attendant, 62 the centrifugal receptacles, 63 the operating shaft for these latter, 64 the operating mechanism for the shaft 63, 65 clutch mechanisms associated with the shaft 63, 66 the hoppers containing the masse-cuites, 16' an agitator within the hopper, 67 the discharge spout for the hopper 66, 44 the charging gate interposed between the spout 67 and the feed spout 68 which discharges into the receptacle 62, 69 the water line, 13 the water supply pipes, each provided with a cut-off 70, and 71 a transmission mechanism for operating a shaft 4, to be hereinafter referred to.

The foregoing elements, with the exception of the transmission 71 and shaft 4, are of known construction, and are illustrated merely by way of example. The water measuring mechanism and the trough shifting mechanism are illustrated somewhat conventionally in Figs. IX and X, but are specifically shown in Figs. I to VIII, and the elements of structure and their arrangement of the water measuring and trough shifting mechanisms will now be specifically referred to.

Referring to Figs. I to VIII of the drawings, and also Figs. IX and X, but more specifically to Figs. I to VIII, 4 denotes an operating shaft, which is driven from the transmission 71, and which is provided with a worm 5. When the shaft 4 is employed in connection with a battery of centrifugals, the shaft is provided with the desired number of worms 5. The shaft 4 revolves in the direction, as indicated by the arrow 4' in Fig. II. A pair of bearings 9, 9' are provided for the shaft 4 and the bearing 9 projects outwardly from an end plate 19, while the bearing 9' projects outwardly from the end wall 10' of a housing 10. The shaft 4 extends through the housing 10 and at each side of the worm 5, has secured thereto, by the hold fast devices 5', collars 5'', and interposed between the collars 5'' and the end plate 19 and also the end wall 10' of the casing 10, are thrust washers 22. The end wall 10', as well as the end plate 19, has its inner face formed with an integral boss 21, against which the thrust washers 22 abut. Each of the bearings 9, 9' is formed with a port 20 for supplying a lubricant to the bearings for the shaft 4.

The end wall 19 is secured to the housing 10, by the lag screws 18. The side walls of the housing 10, at the lower end thereof, have outwardly extending lateral flanges 24, formed with the openings 25, for the passage of securing devices to fixedly connect the housing 10 to the support. The side walls of the housing 10, at the upper end thereof, are each formed with an outwardly extending lateral flange 18', formed with a circular intermediate portion 18''. The flanges 18', that is to say the semi-circular intermediate portion 18'' of each of the flanges 18', form a lower bearing section, for shaft 2. The upper and lower bearing sections of the shaft 2 are indicated at 3 and the said bearing sections are connected together by hold fast devices 3'. Each of the side walls, of the housing 10, at the upper portion of such wall, is shaped to conform to the semi-circular portion 18'' of the flange 18' to provide a clearance for the shaft 2. The clearance at the upper portion of each of the side walls of the housing 10 is indicated at 2', Fig. IV. The bearing sections 3 are provided with vertically disposed ports 20' for the passage of a lubricant to the shaft 2.

The shaft 2 extends in a plane at right angles with respect to the shaft 4, and said shaft 2 projects from each side of the housing 10. Secured to the shaft 2 in any suitable manner, is a mutilated worm gear 1, and that part of the gear 1, which is not provided with teeth, is indicated at 6. The non-toothed portion of the gear 1 is of sufficient width to straddle the worm 5, and by the providing of this mutilated worm gear 1, the shaft 4 with the worm 5 thereon can be operated without imparting motion to the gear 1, or in other words owing to the providing of a mutilated gear 1, the shaft 2 is intermittently driven from the shaft 4.

Mounted on the shaft 2 is a cam 7, the latter is formed with a hub 7', which is keyed to the shaft 2 by the set screw 8. The shaft 2 projects outwardly from the hub 7', and has secured thereon by a washer 15 and cap bolt 16, a ratchet wrench 14.

That portion of the shaft 2 on which is mounted the ratchet 14, as well as the washer 15, is squared as at 15'. Depending from the ratchet 14, is an arm 14' carrying on its free end a counter-weight 17. The cam 7 revolves in the direction of the arrow as indicated, at 16', Fig. II, and the travel of the cam 7 is in the path of a valve stem 11, which projects outwardly from the spring controlled valve mechanism 12, the latter being interposed in the feed pipe 13. The feed pipe 13 extends downwardly, and discharges into the receptacle 62, as clearly shown in Fig. IX. The ratchet 14 and cam 7 are arranged on the outer portion of the shaft 2, and on the inner portion of said shaft 2, is suitably secured a disk 26 having a hub 26' through which extends a set screw 26'' for securing the disk 26 to the shaft 2. Adjustably connected to the rear face of the disk 26 is a cam 27, provided with oppositely disposed arcuate slots 29, through which extend adjusting screws 28, these latter engaging in the disk 26 and providing means for adjustably securing the cam 27 in the position to which it has been adjusted. Projecting rearwardly from the cam 27 is a laterally extending pin 30 which is arranged near the outer edge of the cam 27 and centrally with respect to the ends of the oppositely disposed slots 29.

Mounted on a pivot 33, is a lever arm 32 provided with an extension 31 which is disposed at right angles with respect to one end of the lever arm 32 and is arranged in the path of the pin 30 whereby when the cam 27 revolves, the pin 30 will engage the extension 31 and shift the lever 32 to the position shown in dotted lines in Fig. V. The other end of the lever arm 32 is pivotally connected as at 32' to the upper arm 34 of a bell crank lever. The other arm of the bell crank lever is indicated at 35 and is mounted on a pivot 36. The arm 35 carries a counter-weight 37 also a latch 38. The latch 38 is disposed at right angles with respect to the arm 35 and associates with the hooked end 38' of a trough shifting bar 38ª.

With each receptacle 62, there is associated a pair of troughs indicated at 39, 40 and associated with said troughs is a trough shifting mechanism which includes a locking device consisting of a lever arm 32, extension 31, bell crank lever arms 34 and 35, latch 38 and the hooked end 38' of the trough shifting bar 38ª which forms an element of the trough shifting mechanism. The trough 39 is of less length than the trough 40 and is secured to one side thereof. The trough 39 is adapted to receive the green or first run-off from the wash, and the trough 40 is adapted to receive the second run-off syrup from the material within the receptacle 62. The trough 40, is pivoted as at 42, to a support 42' and the normal position of the troughs 39, 40 is with the trough 39 arranged below the discharge spout 43 of the receptacle 62. The troughs 39, 40, are normally maintained in the position just stated by the engagement of the catch 38 with the hooked end 38' of the rod 38ª. The trough 39 is secured to the rod 38ª, as at 39', and the trough 40 is secured to the rod 38ª, as at 40'. That end of the rod 38ª, opposite the end on which the hook 38' is formed, is provided with an eye 41' to which one end of a pulling spring 41 is attached. The other end 41ª of the spring 41 is anchored in any suitable manner. The hooked end 38' is maintained in engagement with the catch 38 by the action of the spring 41, and when the lever arm 35 is rocked to the position shown in dotted lines in Fig. V, the latch 38 is separated from the hooked end 38' of the arm 38ª and the spring 41 will contract, thereby shifting the trough 40 on its pivot 42, or rather its hinge 42 and swinging the two troughs to the position shown in dotted lines in Figs. VI and VII, and when swung to such position, the trough 40 will be positioned under the spout 43, so as to receive the second run-off syrup from the sugar within the receptacle 62.

The counter-weight 37 is provided to restore the lever arms 32, 34 and 35 to normal position, that is as shown in full lines in Fig. V. The troughs 39, 40 are shifted by a manual operated means to normal position, which carries the shifting bar 38ª therewith and as the lever arm 35 has been restored to normal position by the weight 37, the latch 38 will be in a position to engage the hooked end 38', of the bar 38ª so as to retain the troughs 39, 40 in the position shown in full lines in Figs. VI and VII. As heretofore pointed out the charging gate for the receptacle 62 is indicated at 44 and is shifted to open position, so that the receptacle can be charged, through the medium of the lever arm 45. Intermediate the ends of the lever arm 45, the latter is formed with a slot 46, through which extends a pin 46' carried by a lug 45' projecting from the gate 44. By this arrangement a pin and slot connection is set up between the gate 44 and the lever 45. The lever 45 is manually operated, and for such purpose a handle 47' is provided therefor. The lever arm 45 is mounted on a pivot 47 and from the pivoted end of the lever arm 45, projects an extension 48 which is pivotally connected as at 49, to a link 50, which is articulated, as at 50', to a lever arm 51 fixed to a vertically disposed rock shaft 52 mounted in the bearings 53. Projecting from the lower portion of the shaft 52, is an actuating arm 54 provided with a roller 55, which travels against the trough 40.

The lever arm 45 is manually shifted for the purpose of charging the receptacle 62 and so as to position the trough 39 under the discharge spout 43, and it will be assumed that the troughs are in the position shown in dotted lines in Fig. VII, the lever arm 45, link 50, lever 51 and actuating arm 54, will assume the position illustrated in dotted lines in Fig. VII thereby swinging the troughs 39, 40 to the position shown in full lines in Fig. VII. The manual actuation of the lever 45 causes the manual operation of the connected parts therewith and shifts the troughs to the position shown in full lines in Fig. VII, so that the hooked end 38', of the shifting bar 38ª, will be engaged by the latch 38, whereby the trough 39 will be held under the discharge spout 43.

The manner in which the water measuring mechanism is operated is as follows: It will be assumed that the shaft 4 is operated at a predetermined rate of speed. The ratchet 14 is moved from normal position indicated at A, Fig. II, to the position indicated by dotted lines B, Fig. II. The action of the counter-weight 17 on the handle 14' with respect to the ratchet 14, will cause the tooth 1ª of the worm gear 1 to be held against the worm 5, until the tooth 1ª of the worm gear 1 becomes engaged by the worm 5, causing the worm gear 1 to revolve in the direction shown. The operation of the worm gear 1 will cause the operation of the shaft 2. As the cam 7 is secured to the shaft 2, the cam 7 will be carried with the shaft 2 and engage the valve stem 11, opening the valve mechanism 12, allowing water under pressure to be supplied through pipe 13, through the washing nozzle projecting into the receptacle 62. The cam 7 is so constructed that the valve mechanism 12 will be held opened for one revolution of the cam 7.

By operating the shaft 4 at a predetermined rate of speed, and knowing the ratio between the worm 5 and gear 1, the time of a revolution of the cam 7 can be ascertained, and as the diameter of the pipe 12 is known, as well as the degree of pressure employed in connection with the feed of the water, and also the duration of the opening period of the valve 12 is also known, then the quantity of water supplied in a given time is known.

The speed of the shaft 4 can be varied by application of cone or step pulleys thereto, and the mechanism calibrated so that it can be set to discharge any predetermined amount of water under pressure, in one revolution of the mechanism.

The ratchet wrench 14 is fitted onto the reduced squared end of the shaft 2, and is held thereon by a washer 15 and a nut 16. The ratchet wrench handle is free to move in the direction opposite that shown by arrow 16' and the said movement is independent of any other part of the mechanism. When ratchet wrench handle is moved to position B, the pawl of the ratchet becomes engaged in the ratchet teeth, and the counter-weight 17 on the end of ratchet wrench handle due to its weight and action of gravity, has a tendency to return the ratchet wrench handle 1 to its original position A, and in doing so also turns worm wheel shaft 2 which has keyed onto it cam 7, also worm wheel 1. Therefore, tooth 1ª of worm wheel 1, is held in position to become engaged by the first thread of worm 5, as shaft 4 and worm 5 thereon is revolved in the direction as shown by the arrow 4'. As soon as the first tooth 1ª of worm wheel 1 becomes engaged in worm 5, the worm wheel 1 will continue to turn for one revolution, and in doing so also turns shaft 2 and cam 7. When the blank space 6 of worm wheel 1 again straddles worm 5, the mechanism will again come to rest. During the above cycle, the ratchet wrench handle will have returned to position A. The shaft 4 revolves only in the direction as shown by the arrow 4'. The ratchet wrench handle is so set up as to move only in the direction as indicated on the drawing.

When the water measuring mechanism is thrown into operation, as heretofore stated, the trough shifting mechanism is synchronously operated and such mechanism performs its function of shifting the trough, to provide for separation of green syrup and wash syrup, that is to say, from a position of collecting green syrup, to a position for collecting wash syrup, or vice versa.

From the foregoing description, taken in connection with accompanying drawings, it will be seen that a very simple and efficient device has been produced for regulating the amount of water or other liquid to be applied to washing sugar, or other substances, in centrifugal machines, and for separating the wash syrup or run-off from the green or first run-off, or for any other purposes wherein a predetermined amount of water or other liquid is to be measured under pressure.

It should be understood that any number of water measuring mechanisms, or trough shifting mechanisms may be employed either separately or together, or in other words, the device, one or both, may be multiplied to any extent desired, and further any suitable operating means may be connected to the shaft 4 without departing from the spirit of the invention.

From the foregoing, it will be noted that the invention or construction may be modified in details of construction and arrangement to suit the structural peculiarities of the centrifugal installation, without departing from the spirit of the invention, and I do not desire, therefore, to limit myself to the precise embodiment herein illustrated and described.

What I claim is:—

1. In a centrifugal, a water measuring mechanism, a trough shifting mechanism synchronously operating therewith, and a common actuating mechanism therefor, and a charge gate operating mechanism adapted when actuated to provide for charge of material and further to shift the trough acted on by the trough shifting mechanism to normal position.

2. In a centrifugal, a water measuring mechanism, a trough shifting mechanism synchronously operating therewith and adapted to shift a first run trough from collecting position and a second run trough to collecting position, and a charge gate operating mechanism adapted when actuated to provide for the charge of material and further to shift said second run trough from collecting position and the first run trough to collecting position, and a common actuating mechanism for said water measuring and trough shifting mechanisms.

3. In a centrifugal, a water measuring mechanism, a trough shifting mechanism synchronously operating therewith and adapted to shift a first run trough from collecting position and a second run trough to collecting position, and a charge gate operating mechanism adapted when actuated to provide for the charge of material and further to shift said second run trough from collecting position and the first run trough to collecting position, a common actuating mechanism for said water measuring and trough shifting mechanisms, and means for intermittently operating said actuating mechanism.

4. In a centrifugal, a trough shifting mechanism adapted to shift a first run trough from collecting position and a second run trough to collecting position, operating means for said mechanism, and a charge gate operating mechanism adapted when actuated to provide for the charge of material and further adapted to shift said second run trough from collecting position and the first run trough to collecting position.

5. In a centrifugal, a first run collecting trough, a second run collecting trough, said troughs connected together, one of said troughs being pivoted, means for shifting said first run trough from collecting position and said second run trough to collecting position, and a charge gate operating mechanism for shifting said second run trough from collecting position and said first run trough to collecting position.

6. In a centrifugal, a first run collecting trough, a second run collecting trough, a trough shifting mechanism for shifting said first run trough from collecting position and said second run trough to collecting position, and including a locking device for said first run trough a water measuring mechanism controlling the supply of water for a predetermined period and for releasing said locking device to permit said trough shifting mechanism to shift said second run trough to collecting position, and an actuating means for said water measuring mechanism.

7. In a centrifugal, a receptacle, a charging means therefor, a water measuring mechanism including means for controlling a predetermined supply of water to said receptacle, a controlling member for said charging means, a first run collecting trough, a second run collecting trough, a manually operated and spring controlled shifting mechanism for shifting said first run trough to collecting position and for opening said controlling member and including a locking device for maintaining said first run trough in collecting position against the action of the controlling spring of said shifting mechanism, and means operated from the water measuring mechanism to release said locking device to permit said shifting mechanism to position the second run trough in collecting position.

8. In a centrifugal, a charging means including a controlling gate, a first run collecting trough, a second run collecting trough, a manually operated and spring controlled shifting mechanism connected with said troughs and gate for shifting said first run trough to collecting position and for opening said gate and including a locking device for maintaining said first run trough in collecting position against the action of the controlling spring of said shifting mechanism, and means operated from a water supply mechanism for releasing said locking mechanism to release said shifting mechanism to position the second run trough in collecting position.

9. In a centrifugal, a first run collecting trough, a hinged second run collecting trough having the first run collecting trough connected thereto and bodily movable therewith, means for shifting said first run trough to collecting position and for locking it in such position, said means further including a spring controlled element for shifting said troughs when the first run trough is released to position the second run trough in collecting position, and means to provide for the release whereby the second run trough will be shifted to collecting position.

In testimony whereof, I affix my signature hereto.

ALBERT J. GRAVENBERG.